Oct. 21, 1958        C. PRINCIOTTA        2,856,991
SAFETY DEVICE FOR VEHICLE PASSENGERS
Filed March 13, 1956        3 Sheets-Sheet 1
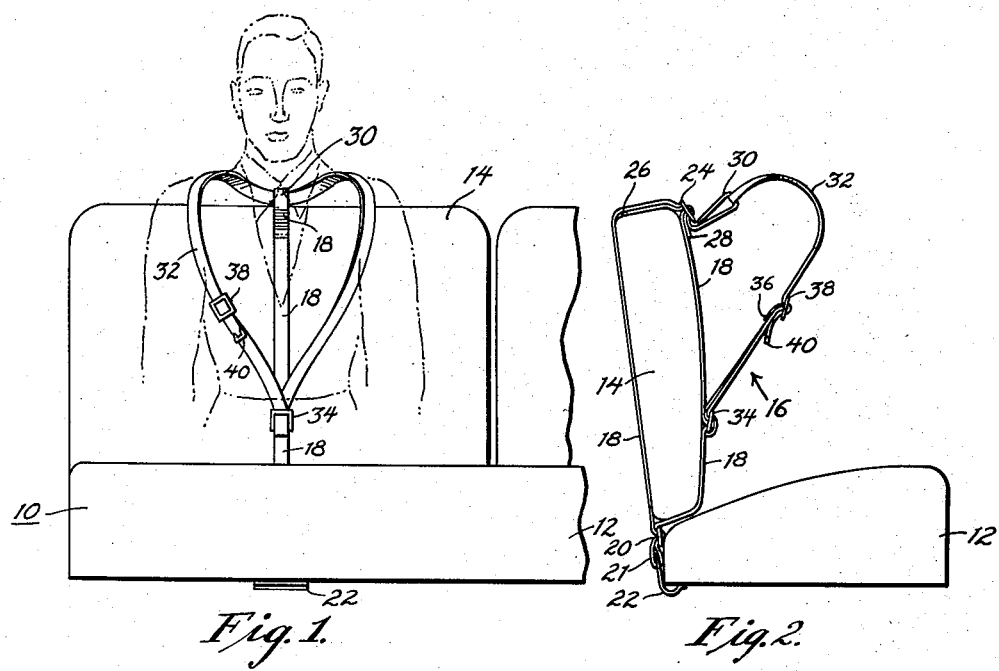
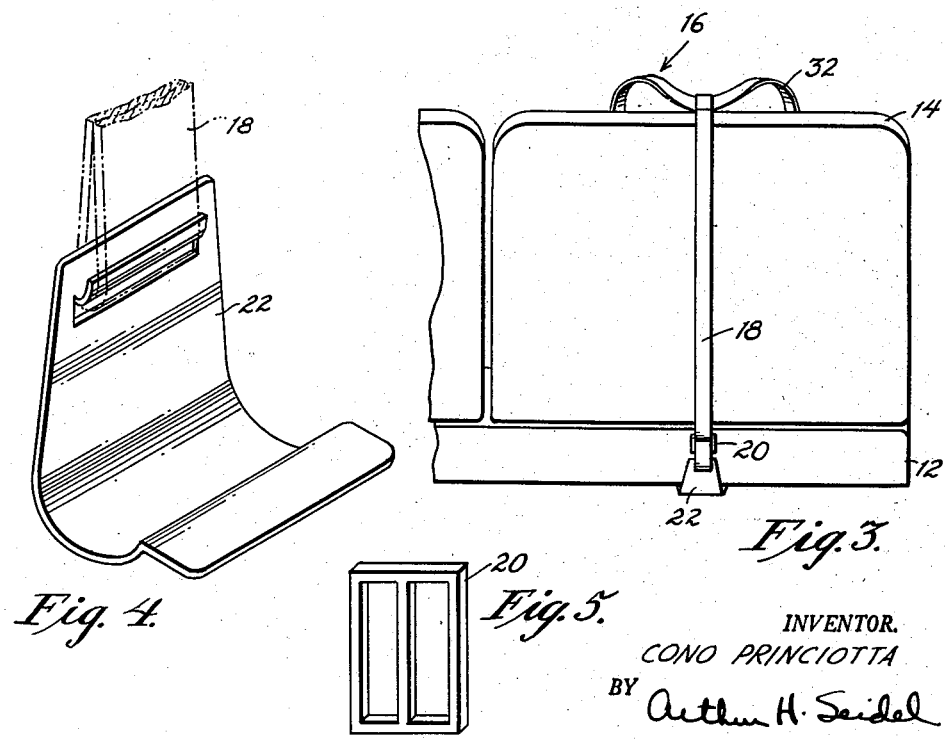
INVENTOR.
CONO PRINCIOTTA
BY Arthur H. Seidel
ATTORNEY.

Oct. 21, 1958 C. PRINCIOTTA 2,856,991
SAFETY DEVICE FOR VEHICLE PASSENGERS
Filed March 13, 1956 3 Sheets-Sheet 2

INVENTOR.
CONO PRINCIOTTA
BY Arthur H. Seidel
ATTORNEY.

Oct. 21, 1958   C. PRINCIOTTA   2,856,991
SAFETY DEVICE FOR VEHICLE PASSENGERS
Filed March 13, 1956   3 Sheets-Sheet 3

INVENTOR.
CONO PRINCIOTTA
BY Arthur H. Seidel
ATTORNEY.

United States Patent Office 2,856,991
Patented Oct. 21, 1958

2,856,991

SAFETY DEVICE FOR VEHICLE PASSENGERS

Cono Princiotta, Upper Darby, Pa.

Application March 13, 1956, Serial No. 571,350

1 Claim. (Cl. 155—189)

The present invention relates to a safety device for vehicle passengers, and more particularly to portable and effective safety belts for vehicle passengers, which may be readily put on and removed.

The present application constitutes a continuation-in-part application of my copending earlier filed application for Letters Patent, Serial No. 555,331, filed December 27, 1955, for Safety Device for Vehicle Passengers.

It is generally conceded that a large number of fatalities and injuries arising from vehicular accidents, such as accidents involving passenger automobiles, buses, trucks, etc., could be avoided were the occupants of such vehicles to utilize appropriate safety devices. Thus, in the case of a collision, or a sudden stopping of a passenger vehicle, a passenger in the front seat and, in particular, his head, is prone to move forward and to crash through the windshield or against the dashboard. Similarly, passengers sitting in the rear seats are apt to fall forward against the front seat of the vehicle.

The use of seat belts to be fastened about the user's waist has been suggested, but by and large such belts have proven to be unsatisfactory, if not indeed actually dangerous. Thus, safety belts, wherein the body is anchored to the seat about the waist, have been shown to function as the fulcrum of a lever, with the head of the wearer constituting one end of the lever pivoting about such fulcrum.

Harnesses comprising vests or criss-cross straps constitute an improvement over the waist-type safety belt, but such forms of harness are objectionable to women. In particular, the criss-cross type of harness which extends diagonally across the chest of the wearer is objectionable, as this form of harness produces the maximum amount of shock on the bosom of the user when the vehicle is involved in a collision or sudden stop. The waist-type, vest and criss-cross harnesses are all exceedingly dangerous to employ in the case of pregnant women, or persons who have undergone abdominal surgery.

Among other desired attributes for a successful safety device for vehicles in addition to its safety functions are those concerned with its convenience in use. These include its applicability to the front seat of two-door passenger vehicles, such as the so-called two-door coaches, two-door hardtops, coupes, convertibles, etc., containing pivotable front seats which pivot forward to provide access to the rear seat. Safety belts for two-door passenger vehicles should preferably anchor the seat back of the front seat in its upright disposition, so that its forward pivotation upon a sudden lurch of the vehicle is prevented.

It is desirable as a practical matter that a safety belt or safety device for vehicles be easy to install, and be readily slipped into and slipped out of by the passenger without an appreciable degree of manipulation or adjustment. Furthermore, safety belts for the seats of vehicles should be adjustable so as to be capable of use with passengers of varying height and girth.

It is also desirable that means for adjusting the fitting of the safety belt or harness be positioned on the front portion of the safety belt or harness where such means is readily accessible to the wearer of the harness.

This invention has as an object the provision of a safety device for automotive vehicles and the like which effectively limits the movement of the passenger user thereof, should the vehicle become suddenly stopped as in a collision, so as to prevent or minimize injury to such passenger.

This invention has as a further object the provision of a safety device which is readily adjustable, and which may be used by passengers of varying height and girth.

This invention has as a yet further object the provision of a safety device which is portable and which may be readily mounted upon a vehicle.

This invention has as a still further object the provision of a safety device of the kind described which is inexpensive to produce and simple to attach and install.

This invention has as another object the provision of a safety harness which may be readily adjusted after the user is seated in the front seat of the vehicle, said safety harness being provided with means for effecting such adjustment, positioned at the front portion thereof.

These and other objects and advantages will appear more fully in the hereinafter specification when taken in connection with the accompanying drawings.

For the purpose of illustrating the invention there are shown in the drawings forms which are presently preferred; it being understood, however, that this invention is not limited to the precise arrangements and instrumentalities shown.

Figure 1 is a front elevational view of the safety device of the present invention in use on a conventional divided back and bottom front seat of an automobile.

Figure 2 is a side elevational view of the seat and safety device shown in Figure 1.

Figure 3 is a rear elevational view of the safety device of the present invention applied to the seat shown in Figure 1.

Figure 4 is a perspective view of the anchoring hook of the safety device of the present invention.

Figure 5 is a perspective view of a link used in the safety device of the present invention.

Figures 6, 8:
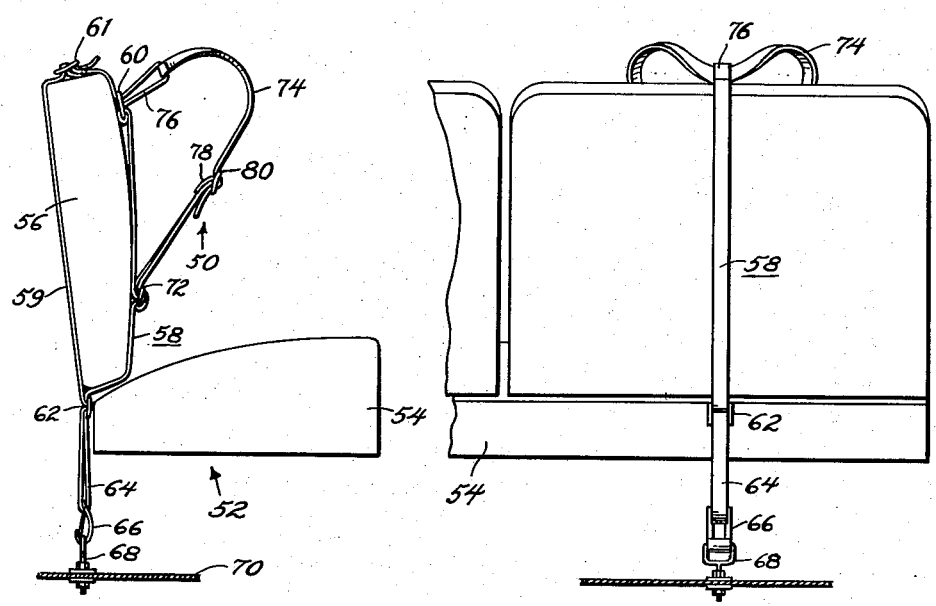
Figure 6 is a side elevational view of another embodiment of the safety device of the present invention mounted upon a seat.
Figure 8 is a rear elevational view of the safety device embodiment of Figure 6 applied to a seat.

Referring initially to Figures 1 through 5, I have shown therein a conventional form of automobile front seat designated generally by the numeral 10 having the bottom portion 12 and the back portion 14 hingedly connected together with a space therebetween. The back portion 14 is normally upright, but may be pivoted forwardly to a limited degree so that passengers wishing to enter the rear of the vehicle may do so. The seat portion 12 and back portion 14 may be covered by upholstery, foam rubber or the like and shaped to accommodate the usual passenger.

The safety device 16 of the present invention comprises a pair of belts or webbing, which may comprise canvas, nylon, plastic or other flexible or elastic belting or webbing material.

The first of said webs 18 carries a link 20, which as is shown in Figure 5 constitutes a generally rectangular frame having a center bar or cross bar in the middle portion of the link disposed parallel to the longer sides thereof. Belt 18 is looped below link 20 to form loop 21, with the loop 21 carrying an anchoring hook 22. Anchoring hook 22 comprises an angle-shaped member of metal, such as aluminum sheet, or steel sheet, which may be die struck to the desired shape. The hook 22 may be inserted beneath bottom portion 12 of automobile seat 10, as will be explained hereinbelow.

One end of web 18 extends upwardly and may be juxtaposed against the rear of back portion 14 of auto seat 10 and extend therefrom over the upper portion of back portion 14 through link 24. Link 24 is similar to link 20, except that it is preferably somewhat larger than link 20. This is desirable as the portion of web 18 which is justaposed to the rear of back portion 14 is doubled up about the center bar of link 24, with the tip 26 on the free end of web 18 and the portion of web 18 adjacent thereto being overlapped by a part of this portion of web 18. The other free end of web 18 adjacent the portion thereof which is justaposed to the front of back portion 14 is permanently looped by means of stitching 28, and carries link 24 by embracing the center bar thereof.

As will be seen particularly in Figure 2, the looped portion of web 18 carried above the permanent loop formed by stitching 28 projects beyond link 24 and forms an adjustable loop 30 whose function will be set forth below.

The size of loop 30 may be adjusted by varying the amount of web 18 projecting beyond link 24.

The safety device 16 comprises a second web 32 which extends between loop 30 and link 34, which is similar to link 20. Link 34 is carried by first web 18 which passes over the center bar thereof. Second web 32 is doubled through link 34 in the manner shown in Figure 2. Thus, the web 32 is looped on the lowermost bar of link 34, that is the bar closest to link 20, with the doubled-over web 32 passing above web 18 on the center bar and between the center bar and the uppermost bar of link 34.

Web 32 is provided with a permanently stitched loop 36, which carries link 38 by embracing the center bar thereof. Web 32 is encircled through link 38 with the end 40 thereof, which may be provided with a metal reinforcing tip, depending below link 38. The portion of web 32 adjacent tip 40 superposes loop 36. The size of the heart shaped loop formed by web 32 may be adjusted by pulling said web through link 38.

The application of the safety device 16 of the present invention by the passenger to the front seat of the vehicle is as follows:

The web 18 is vertically wrapped around back portion 14, by encompassing back portion 14 within the polygon formed by the portion of the web 18 which extends between links 20, 24 and 34. As the size and the shape of this polygon will vary dependent upon the form of the back portion 14, the requisite amount of web 18 may be let out in order to accommodate to the varying contours of the back portion 14. The anchoring hook 22 is placed beneath bottom portion 12, and the polygonal portion of the web 18 between the links 20, 24 and 34 is tightened until the anchoring hook 22 is rigidly positioned in place. It is to be noted that in this disposition, the back portion 14 of seat 10 remains upright and its pivotation is prevented.

The size of loop 30 may be adjusted to meet individual requirements as to comfort and forward movement on the part of the passenger.

Web 32 is passed through loop 30 and may be placed about the arms and shoulders of the passenger in the manner indicated in Figure 1. The size of the loop formed by web 32 may be adjusted by regulating the length of web 32, which is proximate reinforcing tip 40 and passing the same through link 38. The link 38 is on the front right side of the passenger and is readily accessible.

The web 32 may be rocked sidewise through loop 30 resulting in utmost ease of mounting and adjustment.

Figure 7:
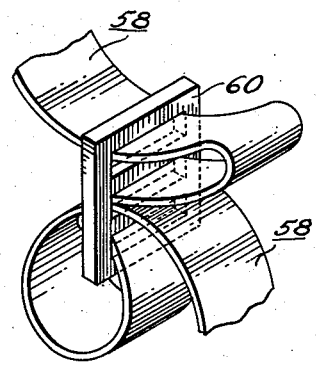
Figure 7 is a perspective view of a link used in the safety device shown in Figure 6 with a portion of the webbing passed therethrough in order to clarify the utility of this link.
Figure 9:
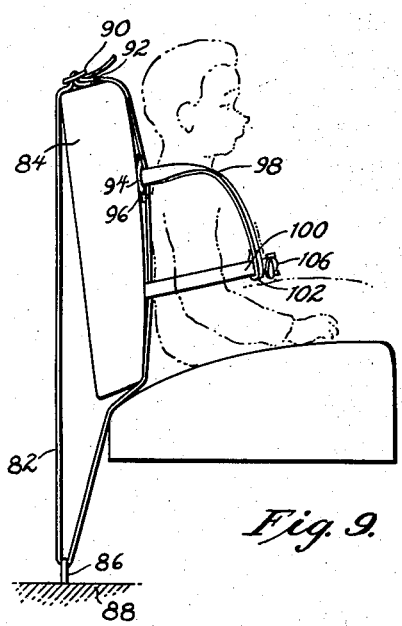
Figure 9 is a side elevational view of another embodiment of the safety device of the present invention.
Figure 10:
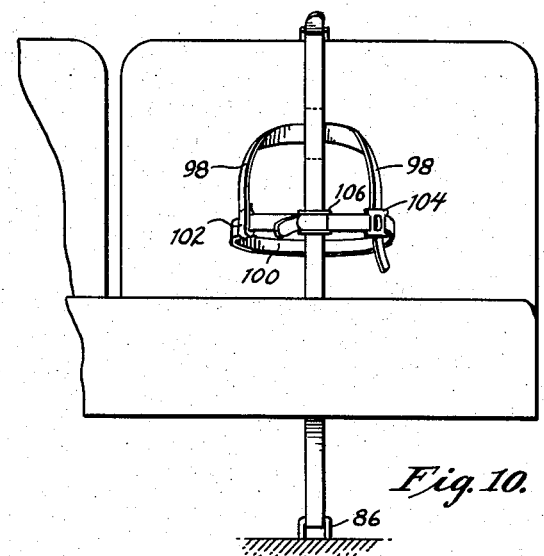
Figure 10 is a front elevational view of a safety device embodiment of Figure 9 applied to a seat.
Figure 11:
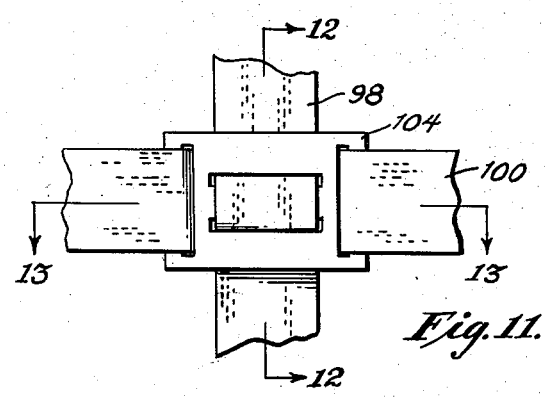
Figure 11 is an elevational view of a link embodiment of the present invention showing the application of webbing thereto.
Figure 12:
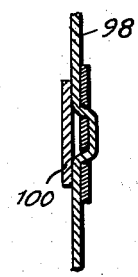
Figure 12 is a sectional view on line 12—12 of Figure 11.
Figure 13:
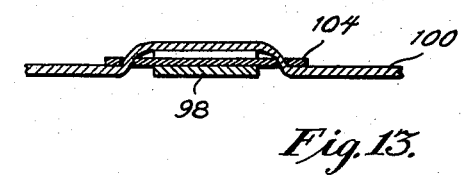
Figure 13 is a sectional view on line 13—13 of Figure 11.

In the embodiment of the present invention shown in Figures 6, 7 and 8, the safety device designated by the numeral 50 is mounted upon an automobile front seat designated by the numeral 52 having the bottom portion 54 and the back portion 56 hingedly connected together with a space therebetween. The back portion 56 is normally upright, but may be pivoted forwardly to a limited degree, so that passengers wishing to enter the rear of the vehicle may do so. As with the embodiment illustrated in Figures 1 through 5 the bottom portion 54 and back portion 56 may be covered by upholstery, foam rubber or the like and shaped to accommodate the usual passenger.

The safety device 50 of the present invention comprises a pair of belts or webs, which may comprise canvas, nylon, plastic or other flexible or elastic belting or webbing material. The first of said webs 58 carries a link 60, which, as shown in Figure 7, constitutes a generally rectangular frame having a series of four spaced parallel bars, including a pair of bars at the extremes of the link and a pair of center cross-bars. The arrangement of web 58 in respect to link 60 is shown particularly in Figure 7, the web 58 being looped through the upper of the center cross-bars, then looped downwardly extending projection 68 anchored in the floor the link 60 through the space between the two center cross-bars. The web 58 extends about seat back 56 and carries a closure link 61 for varying the size of the large loop 59 formed by web 58, and a link 62, the links 61 and 62 being of the type shown in Figure 5. Web 58 is looped below link 62 to form loop 64 which carries a spring-leaf hook 66, which engages with an upwardly extending projection 68 anchored in the floor 70 of the automotive vehicle. As shown in Figures 6 and 8 the upwardly extending projection 68 consists of a threaded bolt and nut arrangement, with the bolt carrying a closed metal loop at its head with which the spring-leaf hook 66 engages.

The web 58 passes under the seat back 56 and carries link 72 on the front face of back portion 56. Link 72 is similar to links 61 and 62, being of the type illustrated in Figure 5.

The web 58 extends from link 72 to link 60, and thus forms a continuous closed loop about back portion 56.

The web 58 will retain seat back 56 in its upright position even though no one is sitting juxtaposed to back portion 56. This is a significant safety feature, as it prevents back portion 56 from pivoting forward due to a sudden lurch of the vehicle, thereby bringing injury to the occupants of the back seat of the vehicle. In order to pivot back portion 56 forwardly, so as to enable users of the vehicle to secure access to the back seat, it is only necessary to disengage spring leaf hook 66 from upwardly extending projection 68.

A second web 74 extends from the loop 76 which depends from link 60. Second web 74 is doubled through link 72 in the manner shown in Figure 6 (the relationship of web 74 to link 72 being identical to that of web 32 to link 34). Web 74 is provided with a permanently stitched loop 78 which carries a buckle 80. In this manner web 74 is shaped into a heart-shaped loop whose size may be adjusted by pulling the web 74 through buckle 80.

Referring to the embodiment of the present invention shown in Figures 9 through 13, there is shown a safety device having maximum utility for little children. The harness shown therein substantially limits the sideward as well as forward movement of its user. Such harness includes a belt 82 which encircles the seat back 84 passing through a projection 86 extending upwardly from the floor 88 of the vehicle and closed at link 90. Link 90 is a link similar to that shown in Figure 5 and is carried by a permanently stitched loop 92. An overlapping ply 94 is stitched to the surface of belt 82 juxtaposed to the front of seat back 84 to form a permanent guide passageway designated by the numeral 96.

A second belt 98 depends from guide passageway 96 and is looped about horizontal belt 100 by means of a permanently stitched loop designated 102. The other end of belt 98 is adjustably engaged with belt 100 by means of buckle 104. As shown particularly in Figures 11, 12 and 13, buckle 104 has a horizontal channel through which belt 100 is passed and a vertical channel through which belt 98 is passed. This permits vertical adjustment of belt 98 in respect to belt 100.

Horizontal belt 100 is provided with an adjustable buckle 106 for adjustably controlling the horizontal loop formed by it. As shown particularly in Figures 9 and 10, belt 100 passes between seat back 84 and belt 82.

The present invention may be embodied in other specific forms without departing from the spirit or essential attributes thereof and, accordingly, reference should be made to the appended claims, rather than to the foregoing specification as indicating the scope of the invention.

I claim:

In a safety belt for a vehicle seat having a seat bottom and a seat back with a space therebetween, the combination including a vertically disposed first belt arranged in a loop of a size sufficiently large to embrace the seat back and pass through the space intermediate the seat bottom and seat back, a link for regulating the size of said loop, a relatively small loop formed from permanently joined overlapped webbing on the upper front portion of said relatively large loop, a second belt carried in said relatively small loop, one end of said second belt having a relatively small loop permanently formed therein, the other end of said second belt carrying link means, and a third belt passing through the relatively small loop formed in the end of said second belt and through the link means carried by said second belt and through the relatively large loop, said third belt including a buckle for regulating its size.

References Cited in the file of this patent

UNITED STATES PATENTS

| | | |
|---|---|---|
| 1,712,198 | Clapp | May 7, 1929 |
| 1,848,313 | Buresh | Mar. 8, 1932 |
| 2,622,664 | Koehler et al. | Dec. 23, 1952 |
| 2,664,140 | Kindelberger | Dec. 29, 1953 |
| 2,758,769 | Nunn et al. | Aug. 19, 1956 |
| 2,818,274 | Manos | Dec. 31, 1957 |

OTHER REFERENCES

Mechanix Illustrated, April 1953 (Ostrander), vol. 48, No. 6, p. 88.